United States Patent
Ukai (10) Patent No.: US 8,312,218 B2
(45) Date of Patent: Nov. 13, 2012

(54) CACHE CONTROLLER AND CACHE CONTROL METHOD

(75) Inventor: Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 684 days.

(21) Appl. No.: 12/230,244

(22) Filed: Aug. 26, 2008

(65) Prior Publication Data

US 2008/0320223 A1 Dec. 25, 2008

Related U.S. Application Data (63) Continuation of application No. PCT/JP2006/303622, filed on Feb. 27, 2006.

(51) Int. Cl.
*G06F 12/00* (2006.01)
(52) U.S. Cl. ......... 711/119; 711/120; 711/154; 711/118
(58) Field of Classification Search .................. 711/119, 711/120, 154, 118
See application file for complete search history.

(56) References Cited

U.S. PATENT DOCUMENTS

| | | | |
|---|---|---|---|
| 5,454,093 A | 9/1995 | Abdulhafiz et al. | |
| 5,526,508 A | 6/1996 | Park et al. | |
| 5,649,231 A | 7/1997 | Kitano | |
| 5,668,971 A * | 9/1997 | Neufeld | 711/111 |
| 5,737,550 A * | 4/1998 | Song | 710/52 |
| 5,828,860 A | 10/1998 | Miyaoku et al. | |
| 6,055,649 A * | 4/2000 | Deao et al. | 714/30 |
| 6,219,773 B1 | 4/2001 | Garibay, Jr. et al. | |
| 6,272,257 B1 * | 8/2001 | Prokop | 382/246 |
| 7,739,451 B1 * | 6/2010 | Wiedenman et al. | 711/118 |
| 7,783,868 B2 * | 8/2010 | Ukai | 712/237 |

FOREIGN PATENT DOCUMENTS

| | | |
|---|---|---|
| JP | 56-19572 | 2/1981 |
| JP | 63-20639 | 1/1988 |
| JP | 63-20640 | 1/1988 |
| JP | 1-205354 | 8/1989 |
| JP | 3-22053 | 1/1991 |
| JP | 3-116345 | 5/1991 |
| JP | 4-153751 | 5/1992 |
| JP | 5-100849 | 4/1993 |
| JP | 6-4403 | 1/1994 |
| JP | 6-222990 | 8/1994 |
| JP | 7-210460 | 8/1995 |
| JP | 7-219844 | 8/1995 |
| JP | 8-44614 | 2/1996 |
| JP | 8-202620 | 8/1996 |
| JP | 2003-122632 | 4/2003 |
| WO | 99/49395 | 9/1999 |

OTHER PUBLICATIONS

Extended European Search Report for corresponding European Application No. 06 71 4759, issued on Jun. 5, 2009.
International Search Report mailed Oct. 10, 2006 in connection with International Application No. PCT/JP2006/303622.
Japanese Office Action issued on Apr. 1, 2009 in corresponding Japanese Patent Application 2008-501580.

* cited by examiner

*Primary Examiner* — Stephen Elmore
(74) *Attorney, Agent, or Firm* — Fujitsu Patent Center

(57) ABSTRACT

A cache controller that writes data to a cache memory, includes a first buffer unit that retains data flowing in via an external bus, a second buffer unit that retrieves a piece of the data to be written to the cache memory, and a write controlling unit that controls writing of the piece of the data retrieved by the second buffer unit to the cache memory.

10 Claims, 7 Drawing Sheets

| CYCLE | TAG | 1 BYTE | 1 BYTE | 1 BYTE | 1 BYTE |
|---|---|---|---|---|---|
| | | | | PA | IDENTIFI-CATION ID |
| 1 | 001 | OPCODE 00110010 | CACHE REGISTRATION INFORMATION | | |
| 2 | 100 | | RESPONSE DATA (WORD0) | | |
| 3 | 100 | | RESPONSE DATA (WORD1) | | |
| 4 | 100 | | RESPONSE DATA (WORD2) | | |
| 5 | 100 | | RESPONSE DATA (WORD3) | | |
| 6 | 100 | | RESPONSE DATA (WORD4) | | |
| 7 | 100 | | RESPONSE DATA (WORD5) | | |
| 8 | 100 | | RESPONSE DATA (WORD6) | | |
| 9 | 101 | | RESPONSE DATA (WORD7) | | |

CACHE CONTROLLER AND CACHE CONTROL METHOD

CROSS REFERENCE TO RELATED PATENT APPLICATION

This application is a continuation application, filed under 35 U.S.C. 111(a), claiming the benefit under 35 U.S.C. 120 and 365(c) of a PCT International Application No.PCT/JP2006/303622 filed Feb. 27, 2006, the disclosure of which is hereby incorporated by reference.

BACKGROUND OF THE INVENTION

1. Field of the Invention

The present invention relates to a cache controller and a cache control method for writing data to a cache memory. The invention particularly relates to a cache controller and a cache control method that enable retrieval of large amounts of data to be written to a cache memory, while achieving downsizing and cost reduction of a chip.

2. Description of the Related Art

Recently, most information processing apparatuses such as computers include a central processing unit (CPU) incorporating a cache memory to improve the processing speed of the CPU by reducing the number of accesses to a main memory generally having low access speed. A cache memory is accessible at high speed. However, because the cache memory has a smaller size than that of the main memory, the cache memory does not always store therein data required by the CPU (i.e., cache miss). In such a case, data stored in an upper-level cache such as a secondary cache or in the main memory needs to be moved in the cache memory on the CPU.

In general, data to be moved in the cache memory is temporarily retrieved in a data register connected to the cache memory, and then written to the cache memory from the data register.

Recent years have seen remarkable technological developments that increase the processing speed of CPUs and also the size of main memories. As a result, a CPU requires more data per unit time, while taking a longer time to retrieve the data from the main memory. This causes a speed discrepancy between the CPU and the main memory, thus relatively increasing memory latency.

Under such circumstances, proper control for moving data into a cache memory is important. For example, Japanese Patent Application Laid-open No. H7-210460 discloses a technology that reduces the amount of data to be moved-in when a main memory has increased loads, and that resumes a move-in of data having an equivalent amount to the reduced data when the load of the main memory becomes smaller.

The technology disclosed in Japanese Patent Application Laid-open No. H7-210460 can efficiently adjust the data move-in when a cache miss occurs. However, the CPU using the data to be moved-in runs at a processing speed limited by the speed of the main memory, thus the technology cannot offset the increased memory latency completely. In this case, the CPU may execute subsequent processes one after another, while performing the move-in of the data for handling the cache miss to improve throughput. This may cause more cache misses simultaneously, increasing the amount of data to be moved-in. Thus, there is a demand to increase the amount of data retrievable at one time by a data register that writes data to the cache memory.

When a data queue in the data register is simply expanded to increase the size of the data register, the data queue dimensionally exceeds a current chip. This is unrealistic because such a chip on which a CPU is mounted needs to have a larger size opposing the downsizing of the chip.

Alternatively, a low cost random access memory (RAM) may be used as a substitute for the data register. Because the data register holds data to be written to the cache memory only temporarily, the RAM serving as a substitute for the data register only needs to have a significantly small size compared with the cache memory. To improve throughput with the RAM having such a small size and serving as a substitute for the data register, the amounts of inflow data and outflow data to and from the RAM per unit time need to be increased according to the amount of data to be written to the cache memory. As a result, a control circuit and a data bus used for the RAM occupy a large area, causing an increase in space and cost of the portion substituting for the data register.

SUMMARY

It is an object of the present invention to at least partially solve the problems in the conventional technology.

A cache controller according to one aspect of the present invention writes data to a cache memory, and includes a first buffer unit that retains data flowing in via an external bus, a second buffer unit that retrieves a piece of the data to be written to the cache memory, and a write controlling unit that controls writing of the piece of the data retrieved by the second buffer unit to the cache memory.

A cache control method of writing data to a cache memory according to another aspect of the present invention includes storing in a first buffer unit, data flowing in from outside, retrieving from the first buffer unit to a second buffer unit, a piece of the data to be written to the cache memory, and controlling, using a controller formed on a chip, writing of the piece of the data stored in the second buffer to the cache memory.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of the present invention will now be described in detail with reference to the accompanying drawings. The following describes a chip incorporating: two CPU cores each including a level 1 cache (L1 cache); and a level 2 cache (L2 cache), in which data is moved in the L2 cache. The present invention can be similarly applied to an arrangement in which data is written to other caches.

Figure 1:
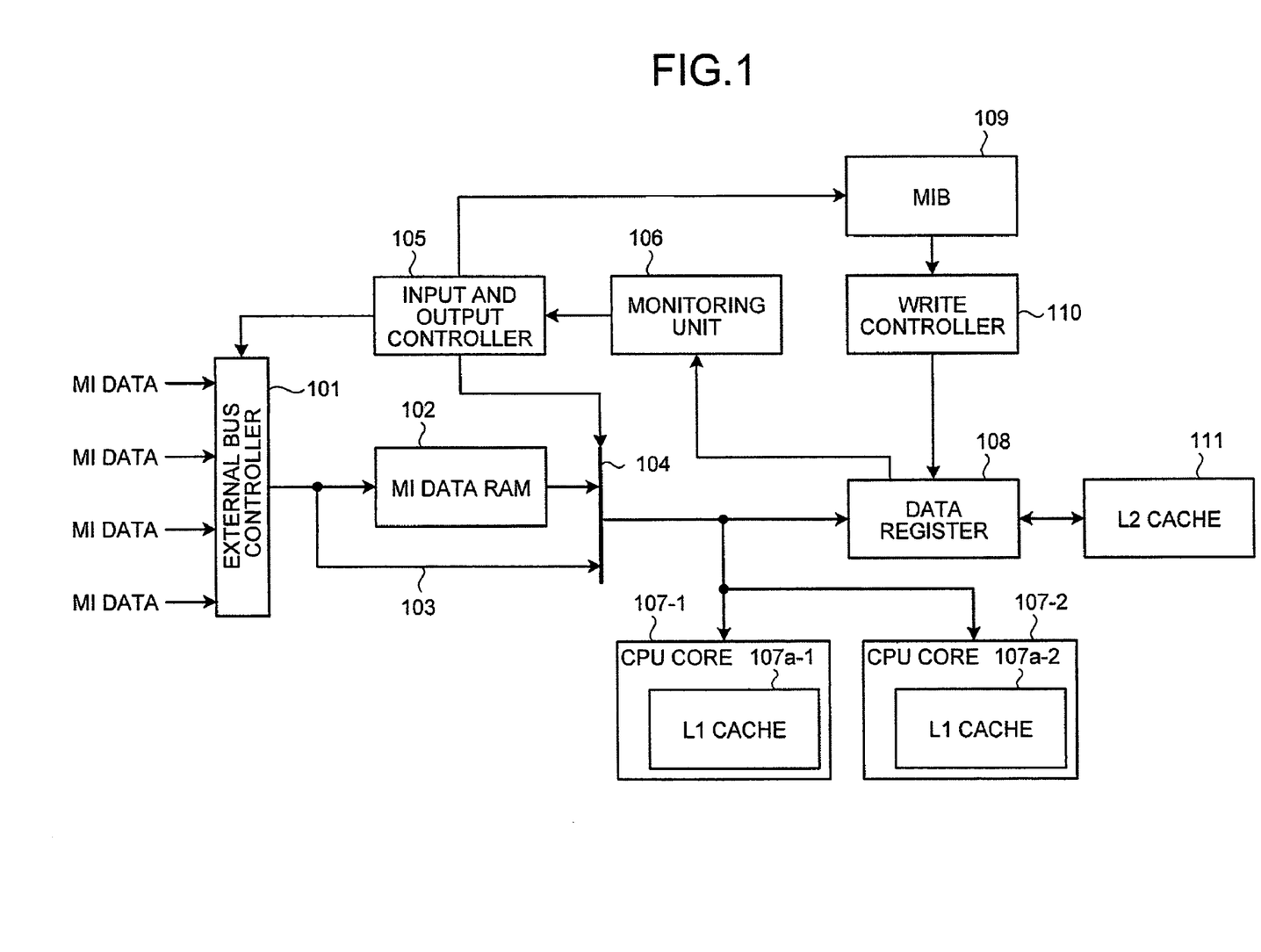
FIG. 1 is a block diagram of a relevant structure of a chip according to an embodiment of the present invention.

FIG. 1 is a block diagram of a relevant structure of a chip according to an embodiment of the present invention. The chip shown in FIG. 1 includes an external bus controller 101, a move-in (hereinafter, "MI") data RAM 102, a bypass path 103, a selector 104, an input and output controller 105, a monitoring unit 106, CPU cores 107-1 and 107-2, L1 caches 107a-1 and 107a-2, a data register 108, a move-in buffer (hereinafter, "MIB") 109, a write controller 110, and an L2 cache 111. Although FIG. 1 depicts four inflow paths for MI data to the chip, the number of inflow paths for MI data may be one or a plural number other than four.

The external bus controller 101 is connected to an upper-level cache, a main memory, or other chips (all not shown) provided outside of the chip through external buses. The external bus controller 101 controls a plurality of external buses (four in FIG. 1) that serve as paths through which data is flowed in the chip, and temporarily registers MI data flowing in from the external buses in an internal register thereof. Further, the external bus controller 101 inputs MI data from any of the external buses to the MI data RAM 102 and the bypass path 103, in synchronization with the control performed by the input and output controller 105.

The MI data RAM 102 stores therein MI data output from the external bus controller 101. When the data register 108 has a space available for retrieving MI data, the MI data RAM 102 outputs MI data to the data register 108 via the selector 104. Thus, the MI data RAM 102 serves as a buffer provided upstream of the data register 108. Specifically, the MI data RAM 102 is constituted by a static random access memory (SRAM) capable of storing therein all pieces of MI data that are transferred in response to all move-in requests issued in same time period.

Because the MI data RAM 102 is a buffer for the data register 108, there is no need to increase the amounts of inflow data and outflow data per unit time according to the amount of data to be written to the cache. However, a certain throughput needs to be achieved that can process the amount of inflow data from the external buses.

The bypass path 103 allows bypassing of MI data output from the external bus controller 101. If the data register 108 has an area available for retrieving the MI data or if the bypass path 103 needs to output MI data directly to the CPU cores 107-1 and 107-2, the bypass path 103 outputs the MI data to the data register 108 or the CPU cores 107-1 and 107-2 via the selector 104.

According to the control performed by the input and output controller 105, the selector 104 selectively outputs either MI data stored in the MI data RAM 102 or MI data passed through the bypass path 103 to the data register 108 and the CPU cores 107-1 and 107-2.

The input and output controller 105 performs control such that MI data flowing in the external bus controller 101 in the cycle of the external buses is input to the MI data RAM 102 and the bypass path 103 in the CPU cycle, and that the selector 104 outputs the MI data supplied from the MI data RAM 102 or the bypass path 103. To this end, the input and output controller 105 selectively determines either the MI data RAM 102 or the bypass path 103 as a source of MI data depending on whether an available space is in the data register 108 based on a report from the monitoring unit 106, so as to control the selector 104 to output MI data from the determined source.

After causing the selector 104 to output the MI data, the input and output controller 105 notifies the MIB 109 of information about the MI data thus output. As to when the MI data is input or output under the control of the input and output controller 105, details will be described later.

Figure 2:
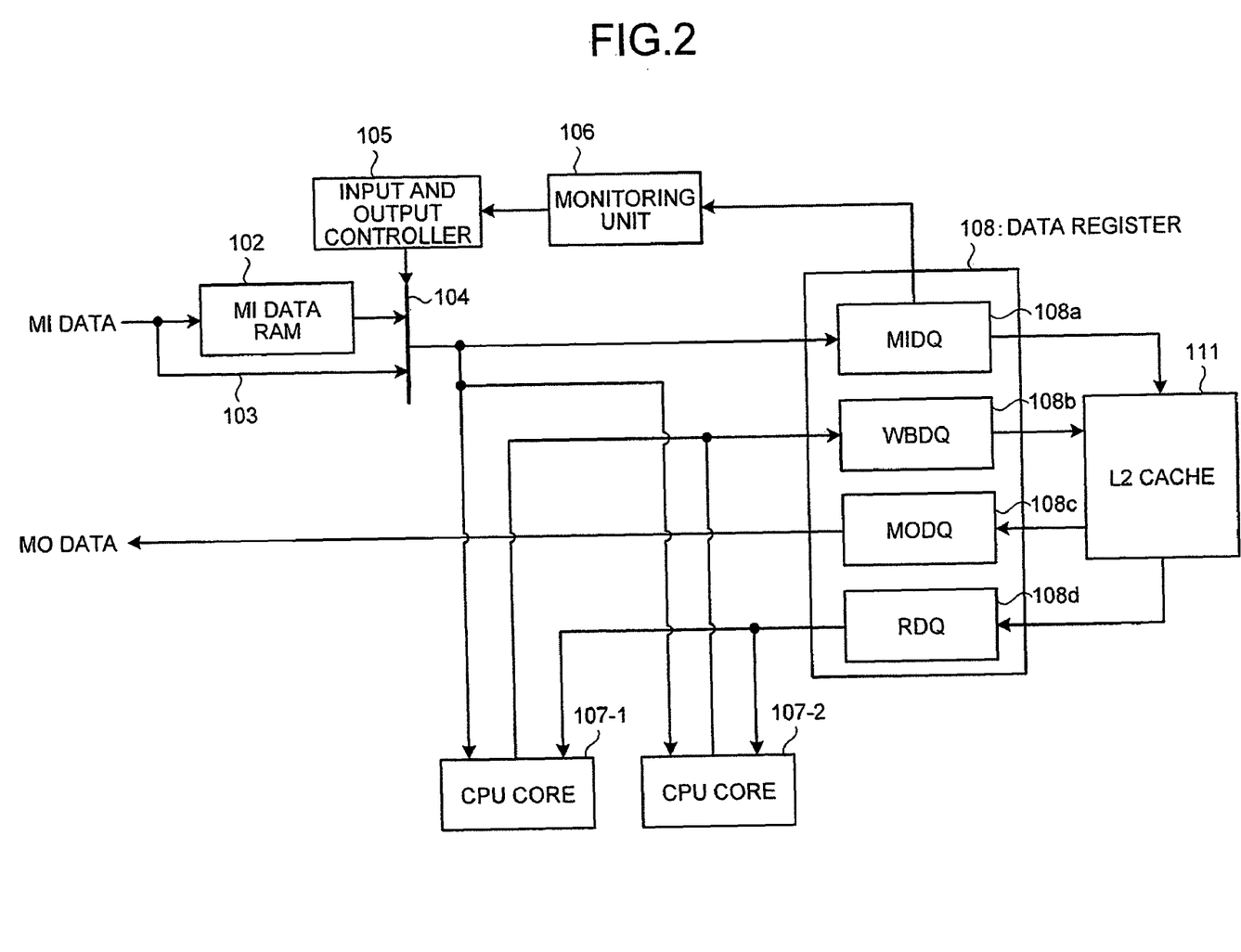
FIG. 2 is a block diagram of an internal structure of a data register according to the embodiment.

The monitoring unit 106 monitors whether an available space is in the data register 108. If the data register 108 has a size available for retrieving MI data, the monitoring unit 106 reports it to the input and output controller 105. As shown in FIG. 2, the monitoring unit 106 monitors whether an available space is in a move-in data queue (hereinafter, "MIDQ") 108a in the data register 108, which will be described later in detail. In this arrangement, the size of the MIDQ 108a may be equally divided according to the number of external buses so that the monitoring unit 106 may monitor available areas of the divided sizes corresponding to the external buses. In this way, when a plurality of external buses are connected to the chip, data pieces flowing in from the respective external buses can be equally retrieved in the MIDQ 108a.

The CPU cores 107-1 and 107-2 incorporate the L1 caches 107a-1 and 107a-2, respectively, and perform predetermined processes using data stored in the L1 caches 107a-1 and 107a-2, data read from the L2 cache 111, and MI data supplied from the outside of the chip.

The data register 108 once retrieves data to be written to the L2 cache 111 and data read from the L2 cache 111, writes write data including MI data to the L2 cache 111, and outputs the read out data to, for example, the L1 caches 107a-1 and 107a-2 of the CPU cores 107-1 and 107-2. Specifically, the data register 108 includes the MIDQ 108a, a write-back data queue (hereinafter, "WBDQ") 108b, a move-out data queue (hereinafter, "MODQ") 108c, and a read data queue (hereinafter, "RDQ") 108d, for example as shown in FIG. 2.

The MIDQ 108a retrieves MI data output from the selector 104, and writes the MI data thus retrieved to the L2 cache 111. The MIDQ 108a has a size allowing retrieval of two data sets for one external bus. In the present embodiment, because four external buses are connected to the chip, the MIDQ 108a has a size allowing retrieval of eight data sets in total. With this structure, data from all the external buses can be processed such that while a data piece is being retrieved in the MIDQ 108a, a data piece already stored in the MIDQ 108a is written to the L2 cache 111.

The WBDQ 108b retrieves write-back data to be written back from the L1 caches 107a-1 and 107a-2, and writes to the L2 cache 111 the write-back data thus retrieved. The MODQ 108c reads from the L2 cache 111 move-out data ("MO data" in FIG. 2) that is externally requested outside of the chip to be moved out from the L2 cache 111, so as to output it to an external destination, outside of the chip, having made the move-out request. The RDQ 108d reads from the L2 cache 111 read data that is requested by the CPU cores 107-1 and 107-2 to be read out, so as to output it to the CPU cores 107-1 and 107-2.

Referring back to FIG. 1, the MIB 109 is a buffer that stores therein requests for moving data into the L2 cache 111. When notified of information about the MI data by the input and output controller 105, the MIB 109 deletes a request that corresponds to the MI data, and notifies the write controller 110 of the deletion.

The write controller 110 controls the data register 108 to write to the L2 cache 111 MI data that corresponds to the request thus deleted from the MIB 109. Specifically, when notified that the request has been deleted by the MIB 109, the write controller 110 instructs the data register 108 to write to the L2 cache 111 MI data that has been retrieved in the MIDQ 108a, and that corresponds to the deleted request.

The L2 cache 111 stores therein data required by the CPU cores 107-1 and 107-2. When the L2 cache 111 stores therein no data required by the CPU cores 107-1 and 107-2 (when a cache miss occurs), desirable data is moved in from the upper-level cache, the main memory, or other chips outside of the chip.

Among these processing blocks, the external bus controller 101, the MI data RAM 102, the bypass path 103, the selector 104, the input and output controller 105, the monitoring unit 106, the data register 108, the MIB 109, and the write controller 110 control writing of MI data to the L2 cache 111, constituting a cache controller according to the present embodiment.

The following describes operations for moving data into the L2 cache 111 on the chip having the above structure.

When the CPU cores 107-1 and 107-2 request reading of data from the L2 cache 111 and a cache miss occurs because no desirable data is stored in the L2 cache 111, a request is made to the upper-level cache, the main memory, or other chips outside of the chip to perform a data move-in therefrom. Such a request issued in response to a move-in request is stored in the MIB 109.

In response to the move-in request, MI data is flowed in the external bus controller 101 of the chip. In FIG. 1, pieces of MI data are flowed in the external bus controller 101 from respective external buses. The timing as to when the pieces of MI data are flowed in from the external buses may differ. The following describes an arrangement in which MI data is flowed in from any one of the external buses.

Figure 3:
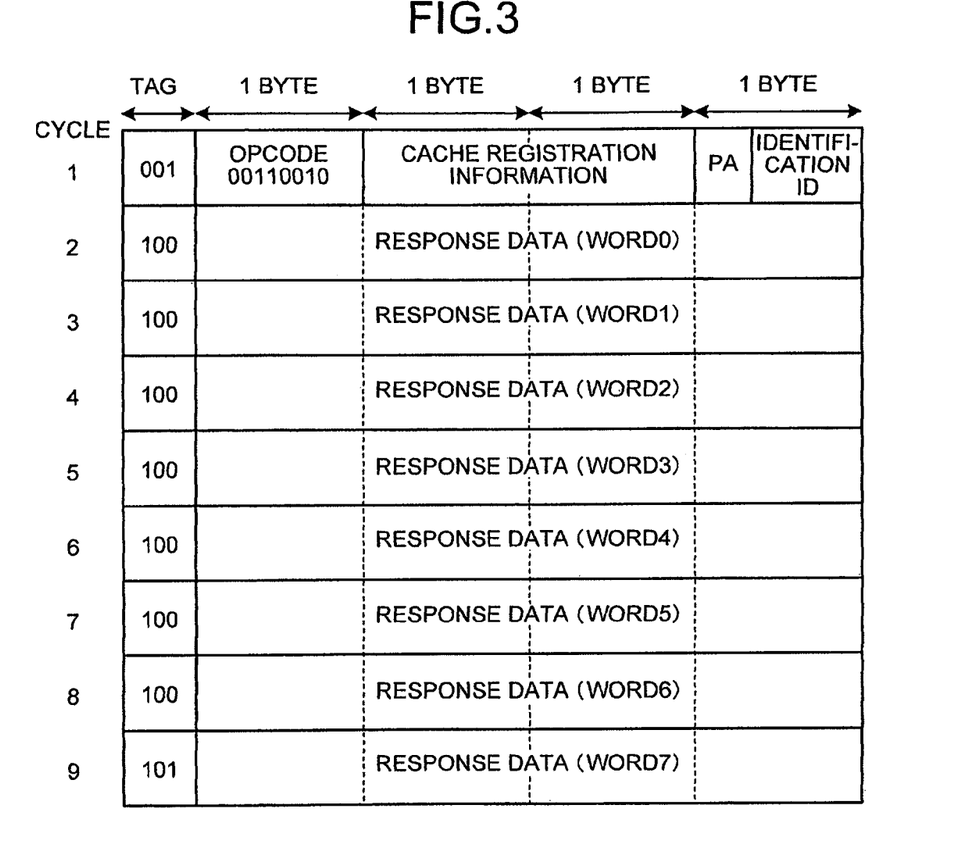
FIG. 3 depicts an exemplary packet configuration of move-in data according to the embodiment.

MI data flowing in the external bus controller 101 is configured as a packet, for example, as shown in FIG. 3. Specifically, the header of four bytes is flowed in the external bus controller 101 in the first cycle of the external bus, and the body of the MI data, i.e., response data (WORD0 to WORD7), is flowed in the external bus controller 101 in the second to the ninth cycles of the external bus. As shown in FIG. 3, the header of the packet of the MI data includes: an operation code (OPCODE) indicating that the packet is a data packet, not a command packet or the like; and a parity bit (PA) used for detecting errors in the packet.

Data of four bytes (i.e., 32 bits) flows in each cycle of the external bus. Each cycle begins with a tag added for indicating whether the cycle is a header or data. Specifically, for example, in FIG. 3, a cycle with a tag "001" is a header, a cycle with a tag "100" is data, and a cycle with a tag "101" is an end of the data.

Such a packet, i.e., the MI data flowed in the external bus controller 101 from the external bus, is once registered in the register of the external bus controller 101, and then input from the external bus controller 101 to the MI data RAM 102 and the bypass path 103 under the control of the input and output controller 105. To this end, considering differences between the cycle of the external bus and the CPU cycle, differences in transferable volume between the external bus and an internal bus in the chip, and other factors, the input and output controller 105 causes the external bus controller 101 to output MI data at a speed that allows MI data flowing in from the external bus not to exceed the acceptable amount of data in the register in the external bus controller 101, so that the MI data is input to the MI data RAM 102 and the bypass path 103. In the present embodiment, because MI data is input to both the MI data RAM 102 and the bypass path 103, the data passed through the bypass path 103 can be retransmitted from the MI data RAM 102. However, when there is no need to retransmit the data, the data may be input to either the MI data RAM 102 or the bypass path 103 according to the selection made by the selector 104 as described below.

On the other hand, the monitoring unit 106 constantly monitors whether an available space is in the MIDQ 108a of the data register 108. If an available area for retrieving MI data is found in the MIDQ 108a, it is reported to the input and output controller 105. Specifically, if an available area is found in the MIDQ 108a, the input and output controller 105 causes the selector 104 to output MI data from the MI data RAM 102 or the bypass path 103 to the MIDQ 108a.

If the MIDQ 108a has an available area when the MI data is output from the external bus controller 101, and also if the MI data RAM 102 stores therein no MI data, the input and output controller 105 causes the selector 104 to output MI data supplied from the bypass path 103. On the contrary, if the MI data RAM 102 has already stored therein MI data, the input and output controller 105 causes the selector 104 to output the MI data supplied from the MI data RAM 102.

Accordingly, MI data is selectively output from the selector 104. This allows MI data to be output to the MIDQ 108a in order of the MI data flowed in the chip from the external bus. Further, if no MI data has been stored in the MI data RAM 102, MI data is output to the MIDQ 108a directly from the bypass path 103. This enables to reduce the time for writing MI data to the MI data RAM 102.

When the CPU cores 107-1 and 107-2 directly request MI data, for example, for prefetching, the input and output controller 105 may control the selector 104 to output MI data supplied from the bypass path 103 directly to the CPU cores 107-1 and 107-2.

When the input and output controller 105 controls the selector 104 and the MI data is output to the MIDQ 108a, information about the MI data is reported to the MIB 109. Then, the MIB 109 deletes the move-in request that corresponds to the MI data thus notified by the input and output controller 105, and the deletion is notified to the write controller 110. Upon deletion of the move-in request from the MIB 109, the write controller 110 provides, aiming to complete the move-in of the corresponding MI data, the MIDQ 108a of the data register 108 with an instruction for writing to the L2 cache 111 the MI data that corresponds to the request deleted from the MIB 109. In response to the instruction, the MIDQ 108a writes the MI data to the L2 cache 111, and the move-in is complete.

Upon completion of the move-in, the MIDQ 108a has an available area. Thus, the monitoring unit 106 reports the available area to the input and output controller 105, causing again the selector 104 to output MI data supplied either from the MI data RAM 102 or the bypass path 103.

Referring to a specific example, the following describes the timing as to when MI data is input to and output from the MI data RAM 102 under the control of the input and output controller 105. Assume that the CPU cycle is three times as fast as the cycle of the external bus and the transferable volume in the internal bus is twice as much as the transferable volume in the external bus. Further, as MI data, the packet shown in FIG. 3 is flowed in the external bus controller 101.

Figure 4:
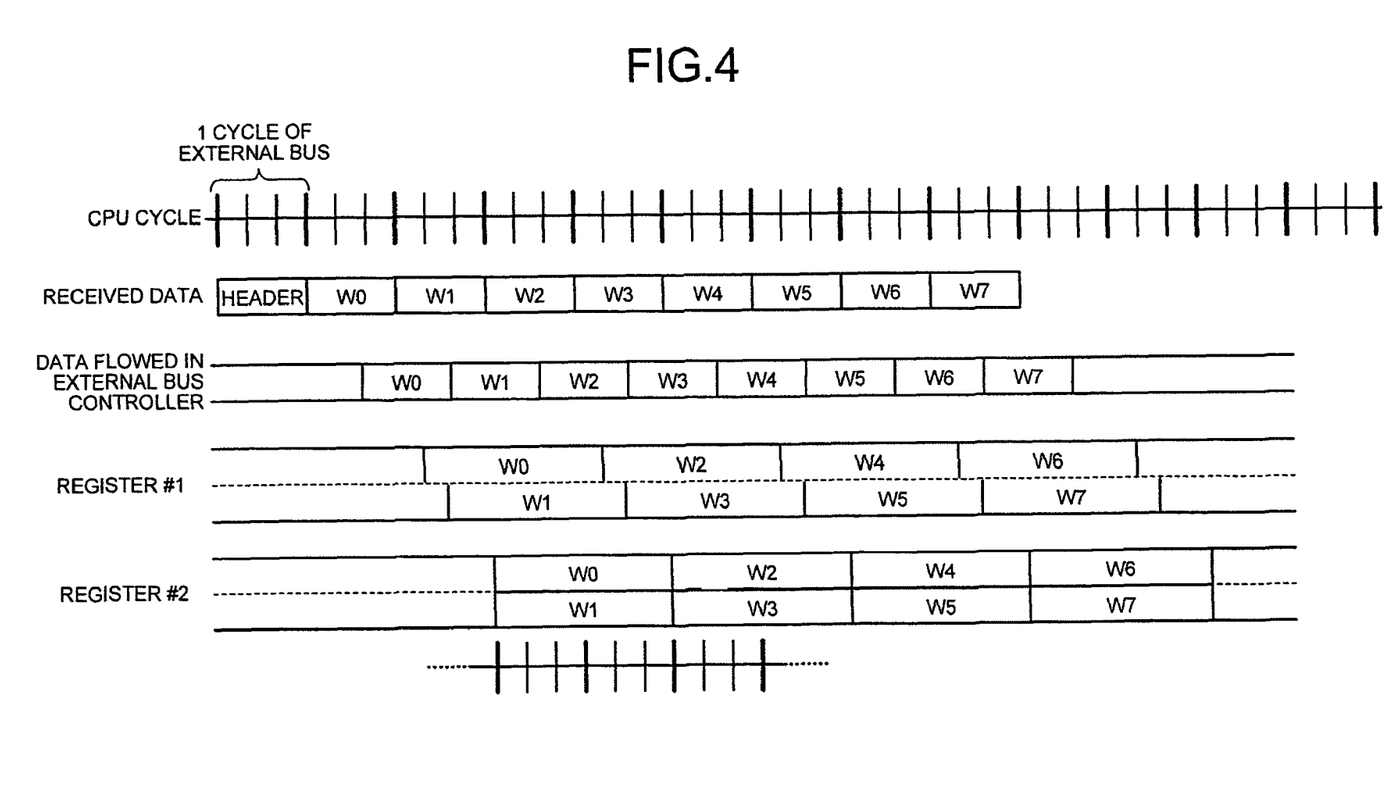
FIG. 4 depicts how data flows in the chip according to the embodiment.

As shown in FIG. 4, the MI data is received by the chip every cycle of the external bus (three CPU cycles) in the order of the header, data W0, data W1, . . . , and data W7. Specifically, data of four bytes is received every three CPU cycles, and the data thus received is flowed in the external bus controller 101 and retained in a register #1 in the external bus controller 101. Depending on the transferable volume in the internal bus, the data thus received in units of four bytes is bundled into data of eight bytes including the data W0 to the data W7, and retained in a register #2. Because the register #2 retains the data in units of eight bytes, the data W0 to the data W7 of four bytes each are retained for a time required for receiving data of eight bytes, i.e., six CPU cycles.

The foregoing describes data flowing in from one external bus. In the present embodiment, MI data flows in the external bus controller 101 from four inflow paths, i.e., the external buses #1 to #4. MI data flows in from any of the external buses #1 and #4 in a similar manner as described above, and therefore data from all the four external buses needs to be input to the MI data RAM 102 and the bypass path 103 during the six CPU cycles. To this end, by assigning one CPU cycle to each of the external buses #1 to #4, data from each of the external buses may be input to the MI data RAM 102 and the bypass path 103 during the assigned cycle. In this way, the data from the four external buses #1 to #4 is input to the MI data RAM 102 and the bypass path 103 during four CPU cycles, thus preventing data overflow in the register of the external bus controller 101.

Accordingly, the amount of data to be input to the MI data RAM 102 in one cycle differs depending on the number of external buses, the clock rate of the chip, the difference in transferable volume between the external bus and the internal bus, and other factors. Therefore, the MI data RAM 102 needs to be capable of accepting the amount of data input in one cycle. Because this amount of data is significantly less than the amount of data accepted in one cycle at the MIDQ 108a of the data register 108, a control circuit and a data bus used for the MI data RAM 102 are dimensionally negligible compared with those used for a RAM serving as a substitute for the data register.

The MI data RAM 102 can perform only either reading or writing of data during one cycle in general. Thus, when four cycles out of six cycles are used for inputting data from the external buses #1 to #4, one cycle of the remaining two cycles is used for outputting data. The other remaining cycle is desirably set as an idle cycle for an interval between data input and data output, thereby preventing interference between input data and output data.

Figure 5A:
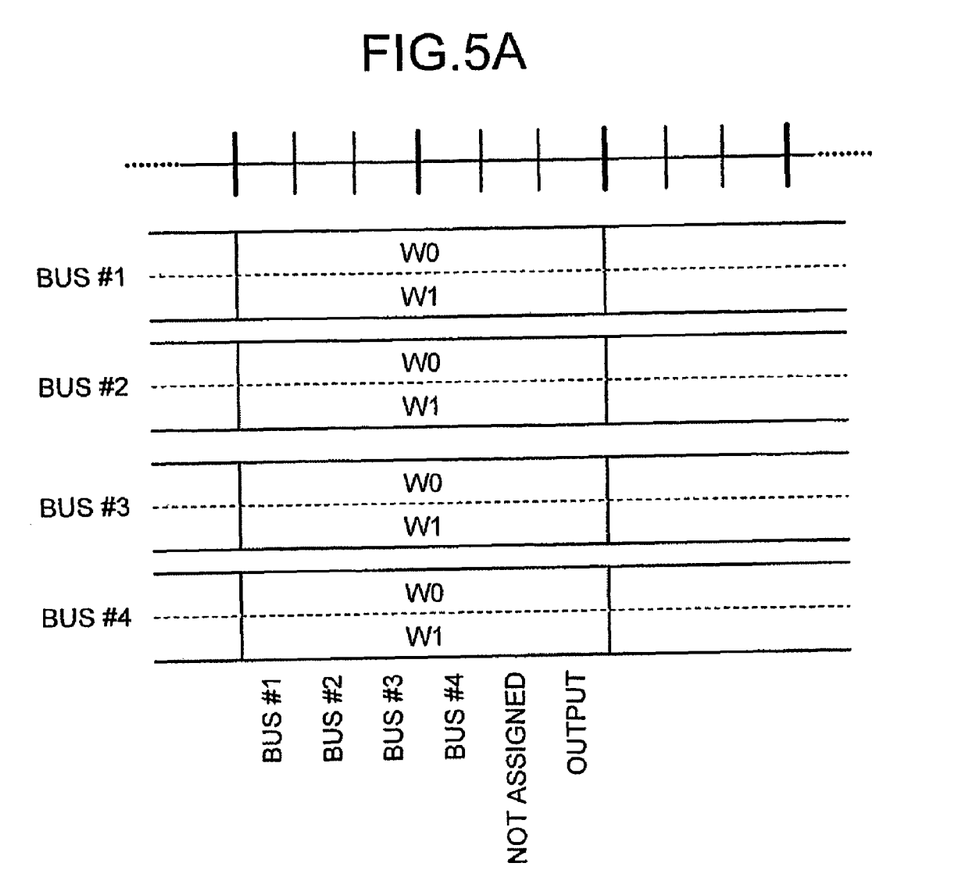
FIG. 5A depicts an example regarding the timing of input and output of data moved in a RAM according to the embodiment.
Figure 5B:
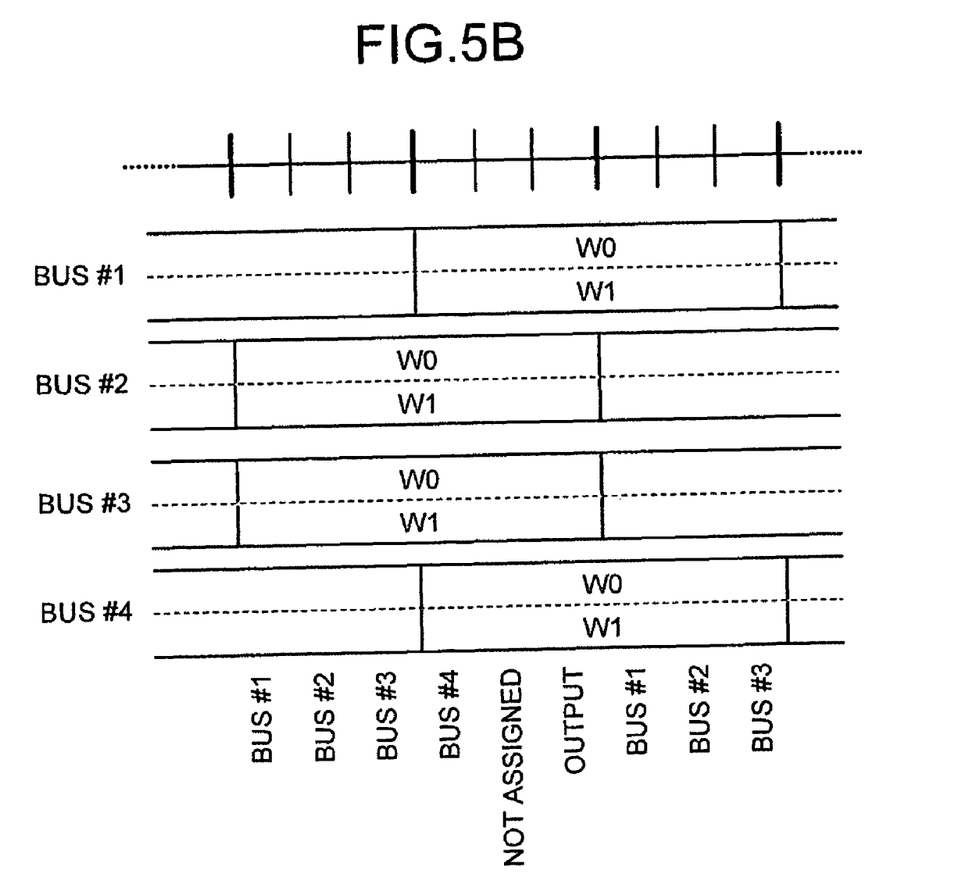
FIG. 5B depicts another example regarding the timing of input and output of data moved in the RAM according to the embodiment.

Accordingly, in the chip connected to the four external buses, i.e., the external buses #1 to #4, when the throughput of the chip according to the transferable volume in the internal bus or the CPU clock rate is at least six times as high as the external buses, data from all the external buses #1 to #4 is input to the MI data RAM 102 and output from the MI data RAM 102 during six cycles, as shown in FIG. 5A. The data is not necessarily flowed in at the same timing from all the external buses #1 to #4. However, for example, even when data from the external buses #1 and #4 is flowed in with delay, the timing when the data from all the external buses #1 to #4 is input to and output from the MI data RAM 102 is always in six cycles, as shown in FIG. 5B.

The data from the four external buses #1 to #4 is input to and output from the MI data RAM 102 so that no data overflows from the MI data RAM 102. This enables retrieval of more data to be written to the L2 cache 111, compared with a chip including only the data register 108. Further, the MI data RAM 102 is connected to the MIDQ 108a of the data register 108, not directly to the L2 cache 111, so that a two-stage buffer is constituted. With this structure, the amounts of inflow data and outflow data per unit time at the MI data RAM 102 may be significantly less than those at the MIDQ 108a, thus achieving downsizing and cost reduction of a control circuit and a data bus used for the MI data RAM 102.

Figure 6:
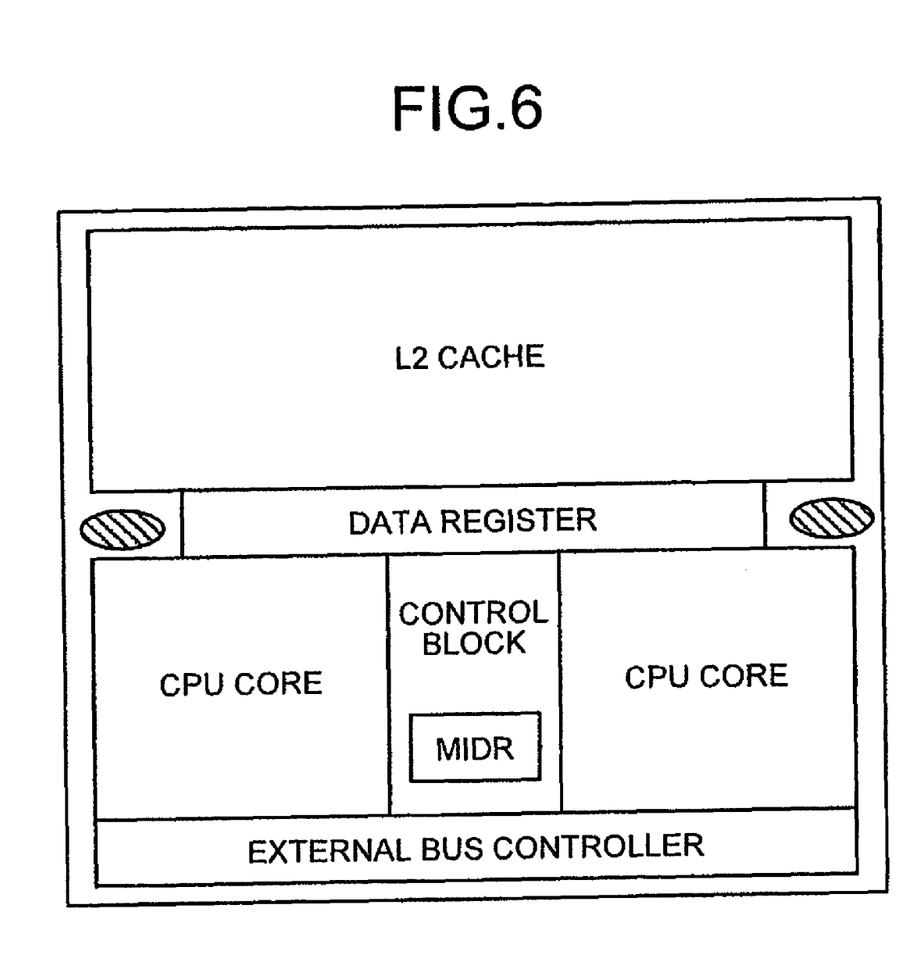
FIG. 6 is a diagram of exemplary circuit placement on the chip according to the embodiment.

Further, by constituting the two-stage buffer in which the RAM is connected to the MIDQ 108a, the distance between the RAM and the MIDQ 108a is not spatially limited, and the position of the MI data RAM 102 is flexibly determined on the chip. Accordingly, circuit placement on the chip can be flexibly determined. Further, because the data register 108 does not change in size, for example, as shown in FIG. 6, dead zones serving no function on the chip (area indicated by hatched lines in FIG. 6) can be suppressed to the minimum. In FIG. 6, MIDR indicates the position of the MI data RAM 102, and CONTROL BLOCK indicates the position of the processing blocks such as the input and output controller 105, the monitoring unit 106, the MIB 109, and the write controller 110.

As described, according to the present embodiment, the RAM that stores therein MI data is provided upstream of the data register in the chip, so as to store therein MI data flowing in the chip. This enables retrieval of large amounts of MI data to be written to the cache memory. Further, because the RAM itself does not perform write operation to the cache memory, an increase in circuit size and cost due to the provision of the RAM is minimized.

In the embodiment, data is written to the L2 cache 111 in the order that the data is output from the MI data RAM 102 to the MIDQ 108a. For example, when data written to the L2 cache 111 needs to be replaced, a wait may be required to write data from the MIDQ 108a to the L2 cache 111. Such a state may be found by the MIB 109 based on the notification made by the input and output controller 105 and the request being stored. Thus, when a wait is required to write data retrieved in the MIDQ 108a, data once retrieved in the MIDQ 108a may be discarded to retrieve subsequent data from the MI data RAM 102 for write operation. Further, the data thus discarded may be retrieved in the MIDQ 108a again for write operation.

According to the embodiment, data flowing in via an external bus to be written to the cache memory is retained in the first buffer. Among pieces of the data retained in the first buffer, a data piece to be written to the cache memory is retrieved by the second buffer, so that the data piece retrieved by the second buffer is controlled to be written to the cache memory. Thus, by using a normal data register as the second buffer, the first buffer can employ a RAM that has small amounts of inflow data and outflow data per unit time, and that incorporates a small size circuit. This enables retrieval of large amounts of data to be written to the cache memory, while achieving downsizing and cost reduction of a chip.

According to the embodiment, the first buffer includes a RAM of a size capable of storing therein all data pieces that can be simultaneously requested to be written to the cache memory. This enables storage of, for example, data pieces of responses corresponding to all move-in requests issued when a cache miss occurs and allows the CPU to perform the subsequent processes, thereby increasing throughput.

According to the embodiment, whether an available area is in the second buffer is monitored, and if an available area is found in the second buffer, the first buffer outputs data to the second buffer. This prevents data overflow in the second buffer that retains data to be written directly to the cache memory, thereby reliably writing all the data to the cache memory.

According to the embodiment, the second buffer is disposed near the cache memory, and the first buffer is disposed farther away from the cache memory than the second buffer. Thus, data can be written quickly from the second buffer to the cache memory, and the position of the first buffer can be flexibly determined on the chip.

According to the embodiment, the first buffer controls data flowing in from a plurality of external buses, and the second buffer includes areas that correspond to the external buses, and that respectively retain data pieces of equal amounts. Thus, even when data is flowed in the first buffer through the external buses from the outside of the chip, data pieces from the respective external buses can be equally written to the cache memory.

According to the embodiment, the second buffer includes an area that retains two sets of write data for each of the external buses. Therefore, while the first set of write data is being written to the cache memory, the next set of write data can be retrieved from the first buffer, thus data can be efficiently written to the cache memory.

According to the embodiment, data flowing in from the outside is allowed to bypass the first buffer, and either data output from the first buffer or data that has bypassed the first buffer is selectively output to the second buffer. This enables the second buffer to directly retrieve data as necessary, thus shortening the time required for input and output of data to and from the first buffer.

According to the embodiment, when the second buffer has an available area, the data that has bypassed the first buffer is selected. This shortens the time for data to be written to the cache memory after its flowing in the chip, when the second buffer has an available area and the time required for input and output of data to and from the first buffer will be wasted.

According to the embodiment, when data is output from the first buffer to the second buffer, the second buffer writes the data to the cache memory. Because the data to be written to the cache memory has been retrieved in the second buffer at write operation performed to the cache memory, the data flowed in the chip can be reliably written to the cache memory.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A cache controller that writes data to a cache memory, comprising:
    a first buffer unit that retains data flowing in via an external bus;
    a second buffer unit that retrieves a piece of the data to be written to the cache memory;
    a write controlling unit that controls writing of the piece of the data retrieved by the second buffer unit to the cache memory; and
    a monitoring unit that monitors whether the second buffer unit has an available area, wherein
    when the monitoring unit finds an available area in the second buffer unit, the first buffer unit outputs data to the second buffer unit.

2. The cache controller according to claim 1, wherein the first buffer unit includes a random access memory (RAM) capable of storing therein all pieces of the data that can be written to the cache memory according to all requests issued simultaneously.

3. The cache controller according to claim 1, wherein
    the second buffer unit is disposed next to the cache memory, and
    the first buffer unit is disposed farther away from the cache memory than the second buffer unit.

4. The cache controller according to claim 1, wherein
    the first buffer unit includes an external bus controlling unit that controls data flowing in from a plurality of external buses, and
    the second buffer unit includes areas that correspond to the external buses, and that retain equal amounts of data.

5. The cache controller according to claim 4, wherein the second buffer unit includes an area for retaining two sets of write data for each of the external buses.

6. The cache controller according to claim 1, further comprising:
    a bypass unit that allows data flowing in from an external bus to bypass the first buffer unit; and
    a selecting unit that selectively outputs either data output from the first buffer unit or data output from the bypass unit to the second buffer unit.

7. The cache controller according to claim 6, wherein the selecting unit selects the data output from the bypass unit when the second buffer unit has an available area.

8. The cache controller according to claim 1, wherein, when the first buffer unit outputs data to the second buffer unit, the write controlling unit controls the second buffer unit to write the data to the cache memory.

9. A cache control method of writing data to a cache memory, comprising:
    storing in a first buffer unit, data flowing in from outside;
    finding an available area in a second buffer unit;
    retrieving from the first buffer unit to the second buffer unit, a piece of the data to be written to the cache memory, when an available area is found in the second buffer unit; and
    controlling, using a controller formed on a chip, writing of the piece of the data stored in the second buffer unit to the cache memory.

10. The cache controller according to claim 5, wherein the second buffer unit retrieves one set of write data to an area, while another set of write data retained in the area is written to the cache memory.

* * * * *